UNITED STATES PATENT OFFICE.

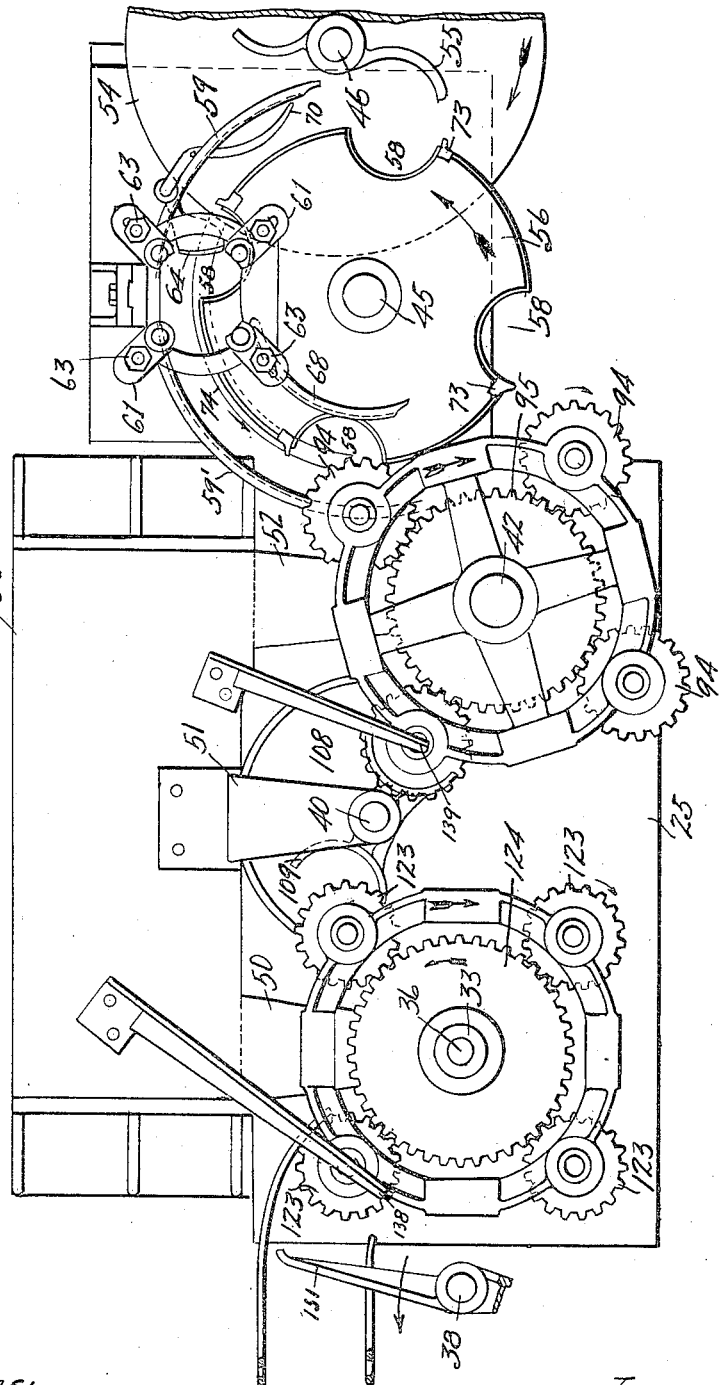

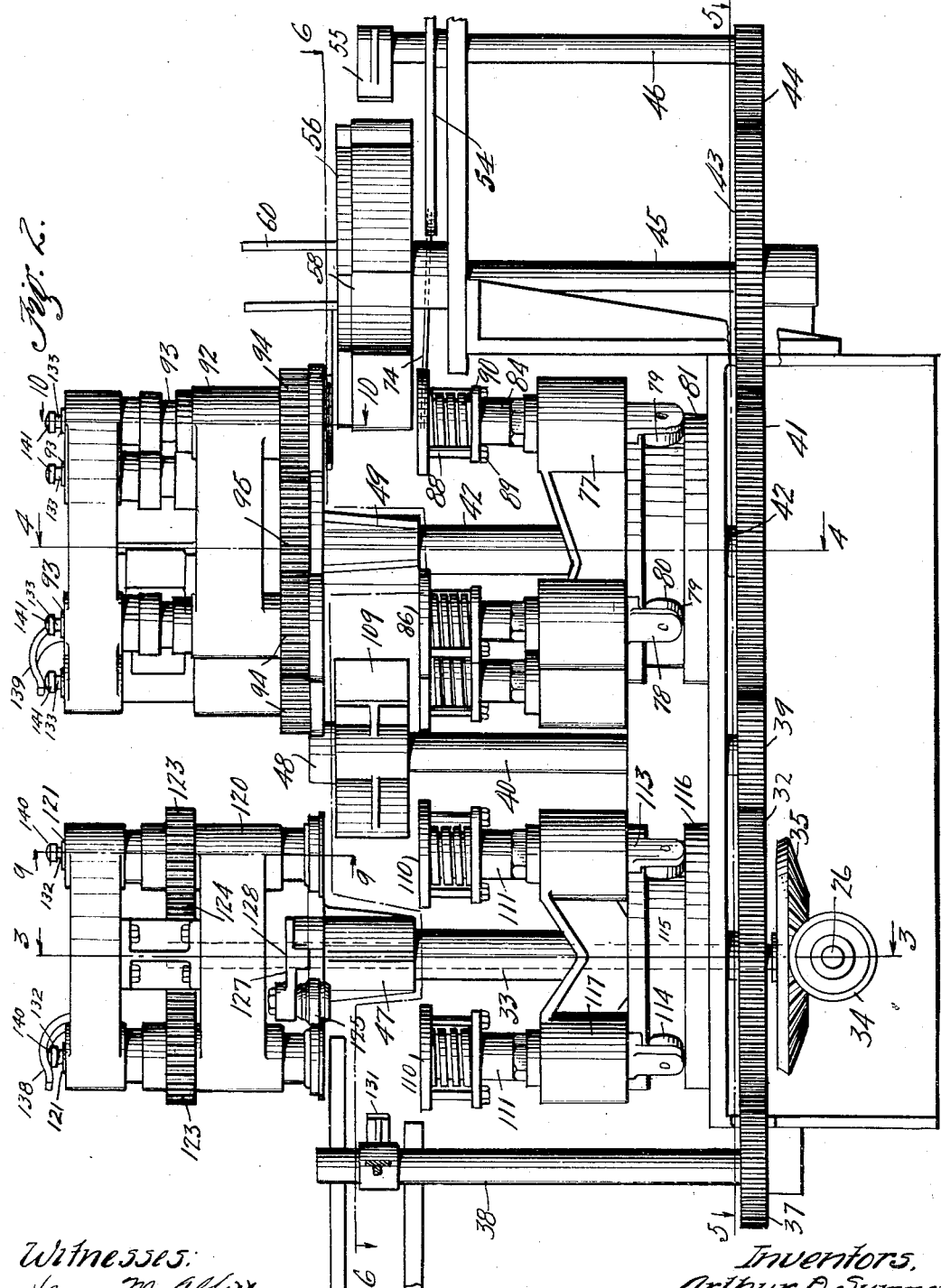

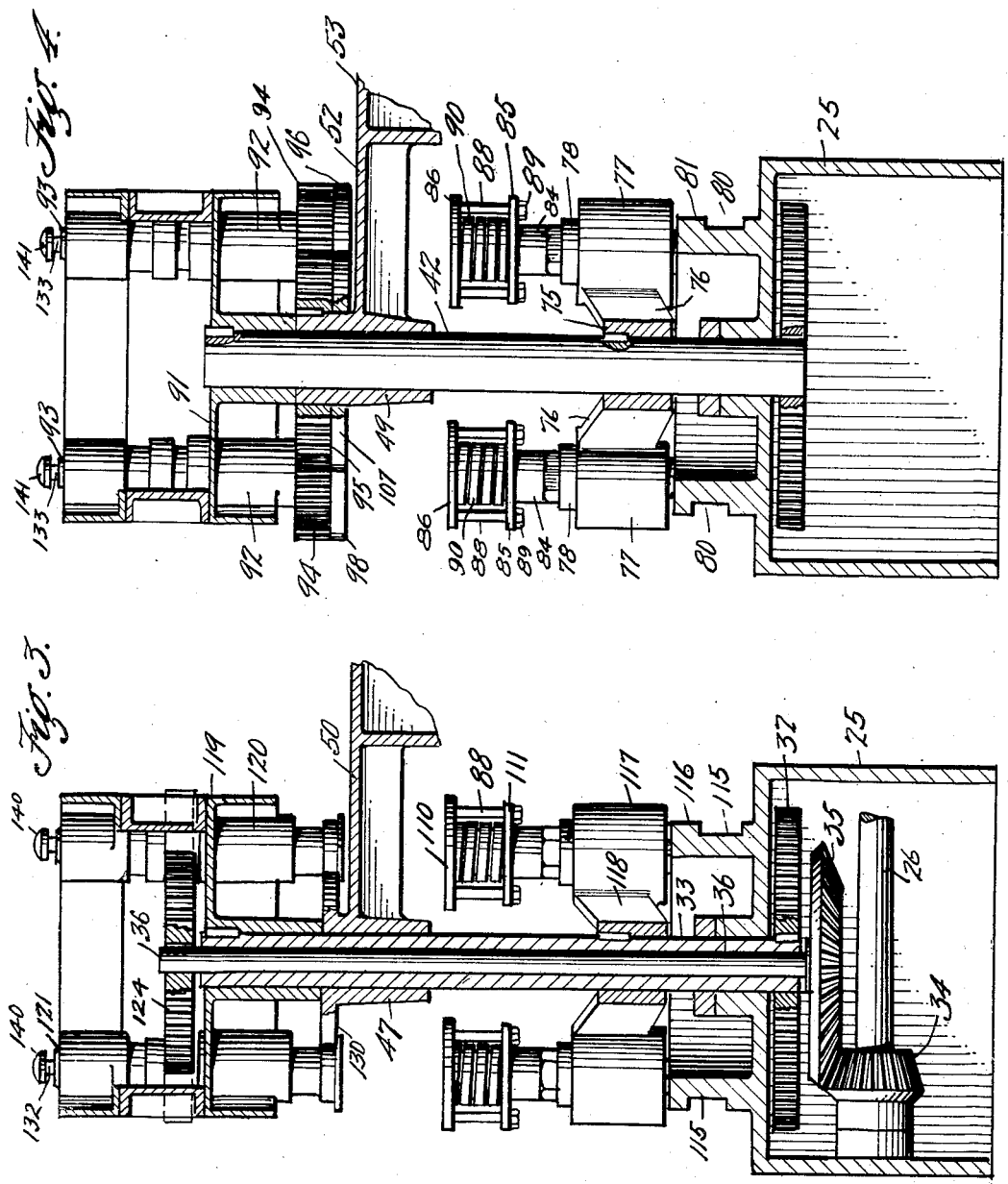

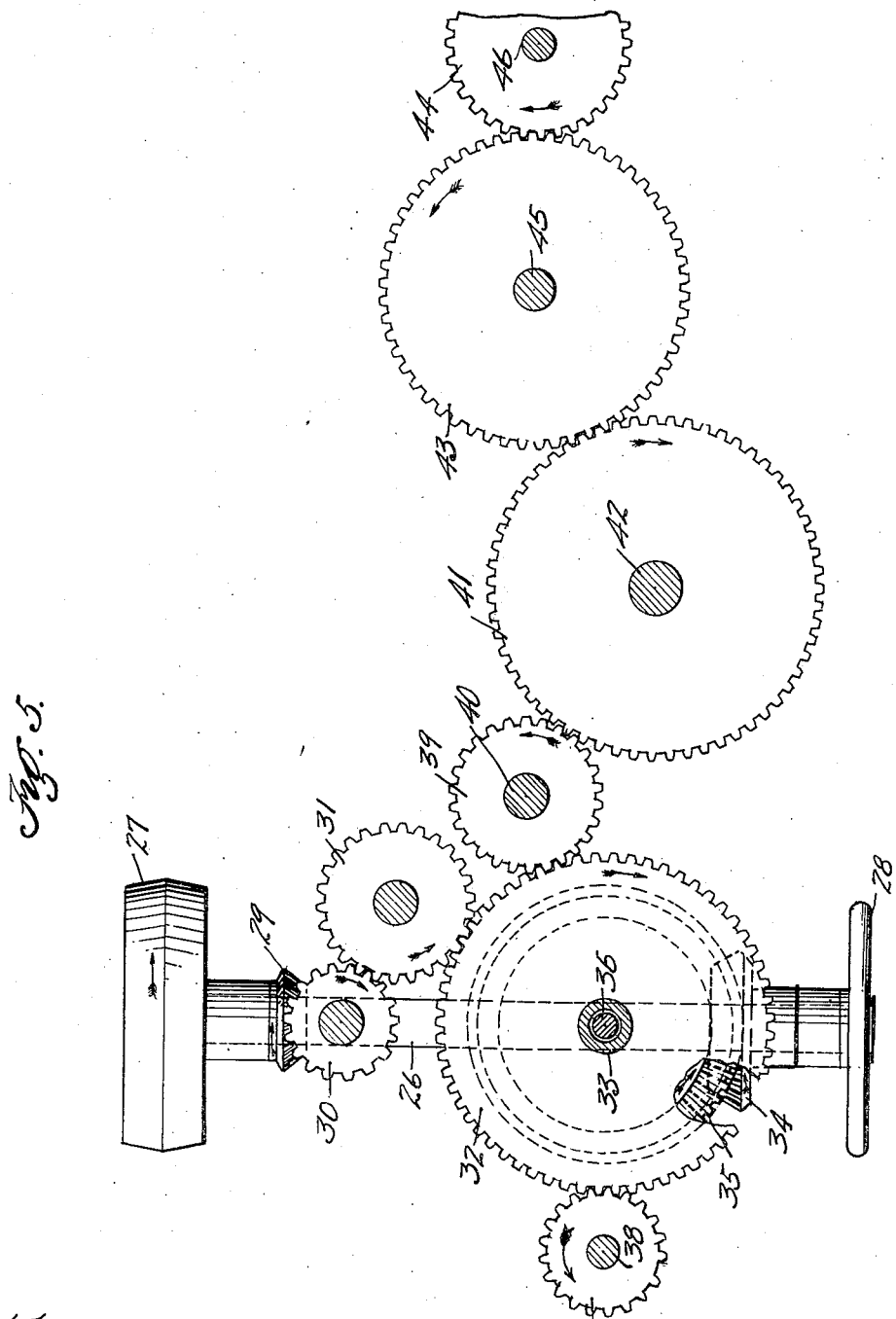

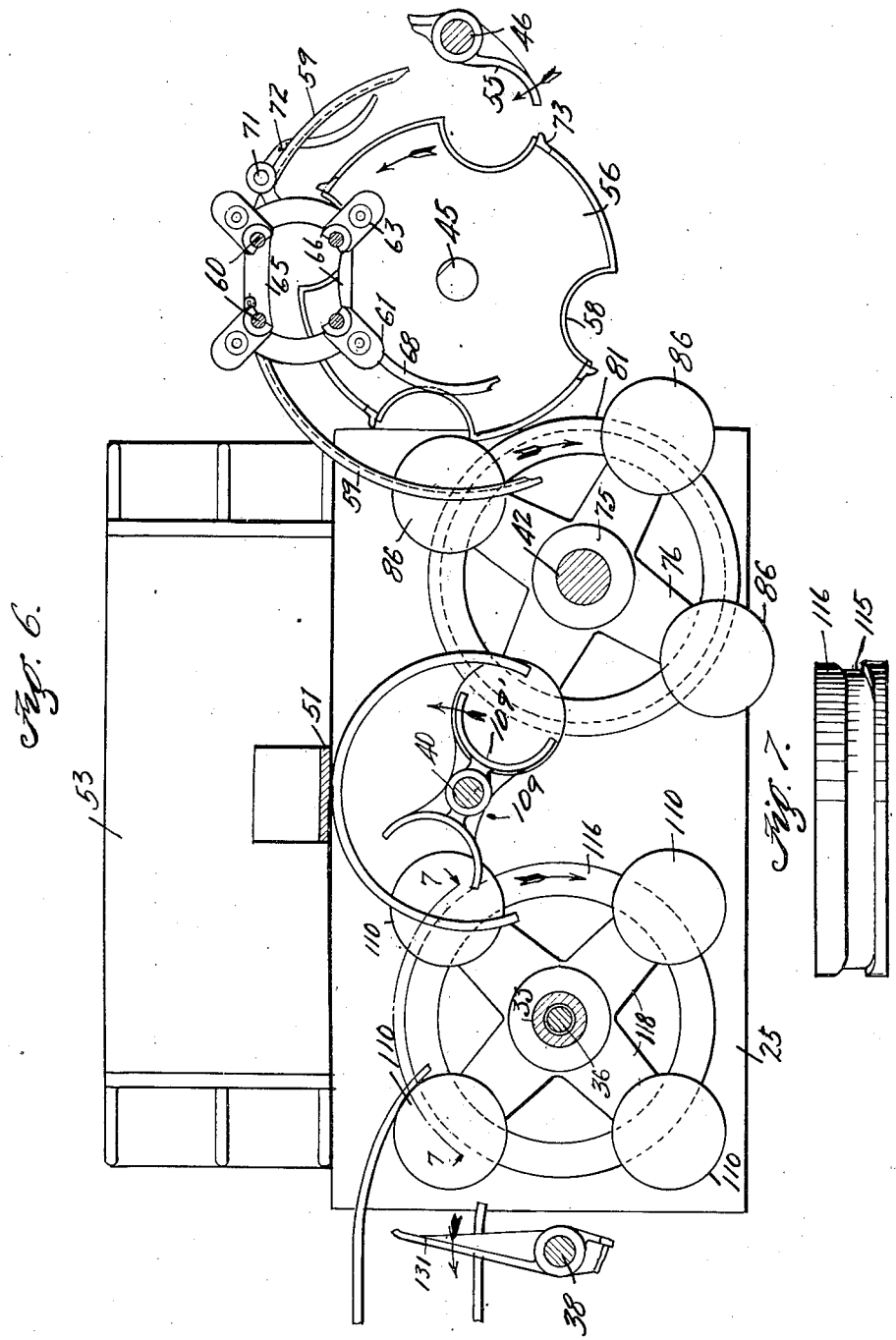

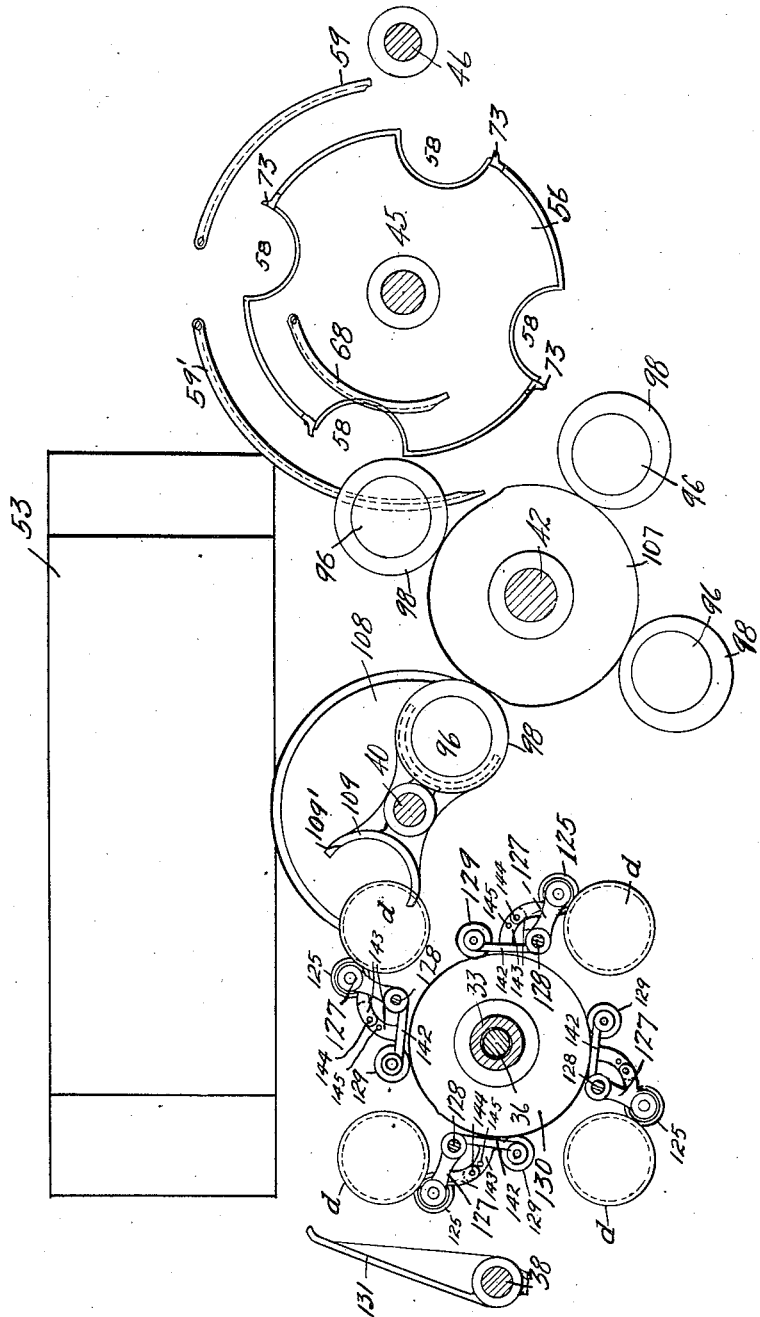

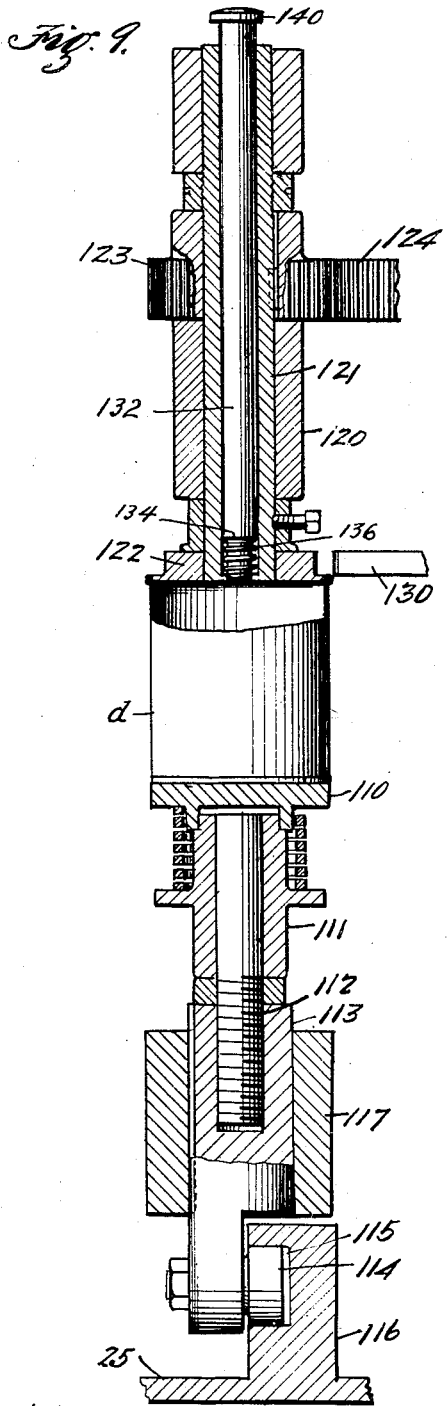
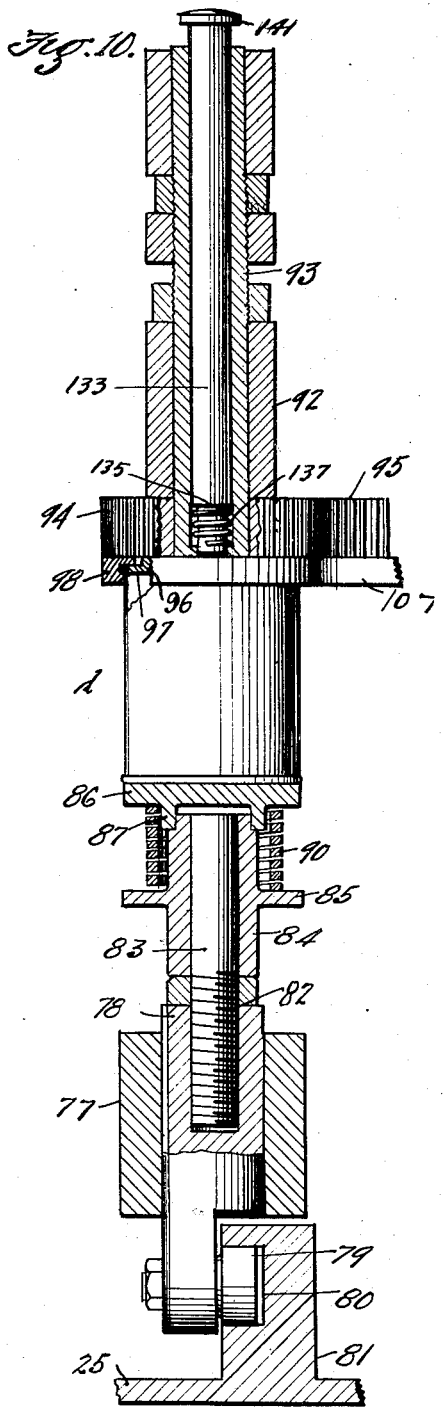

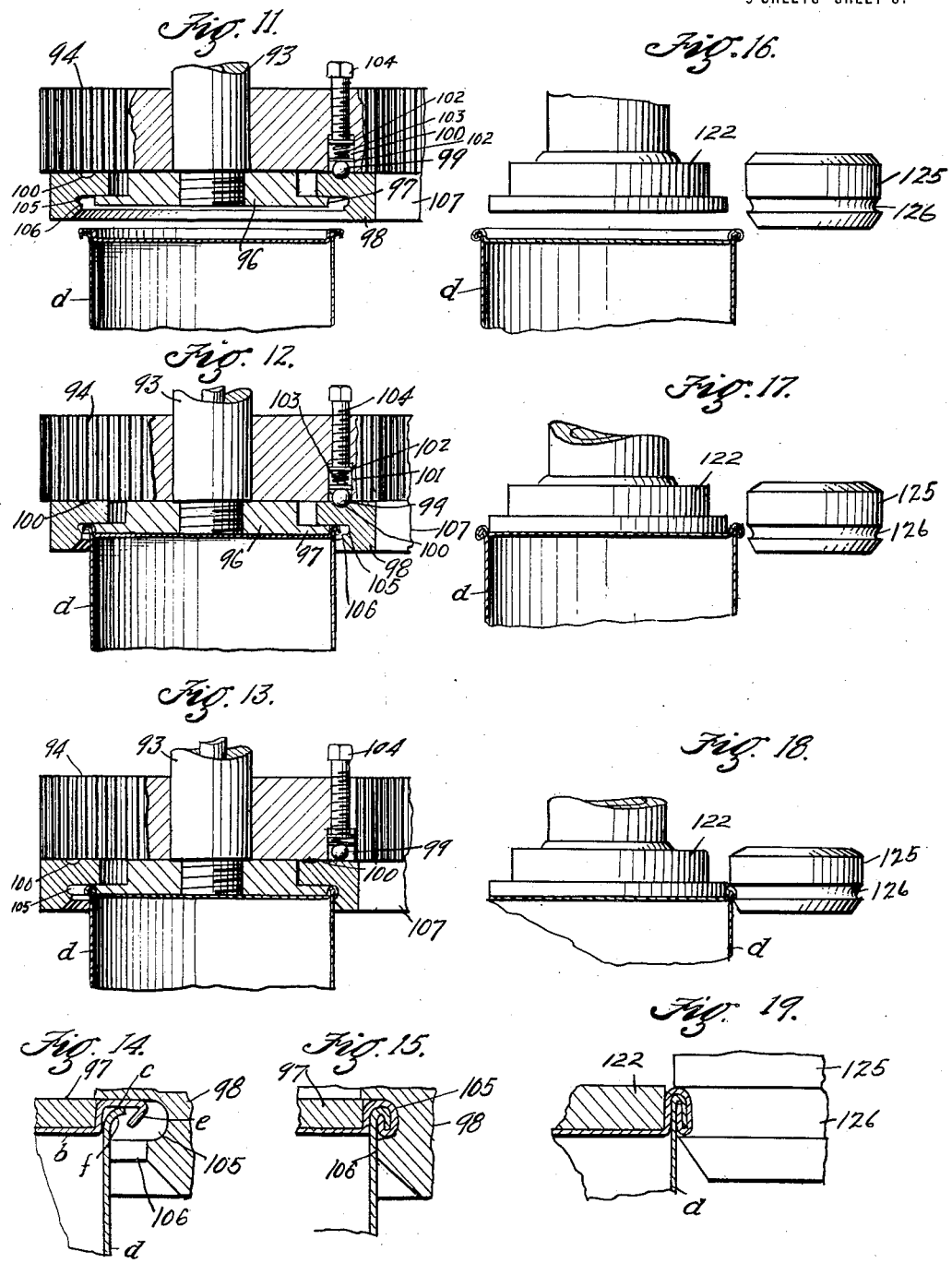

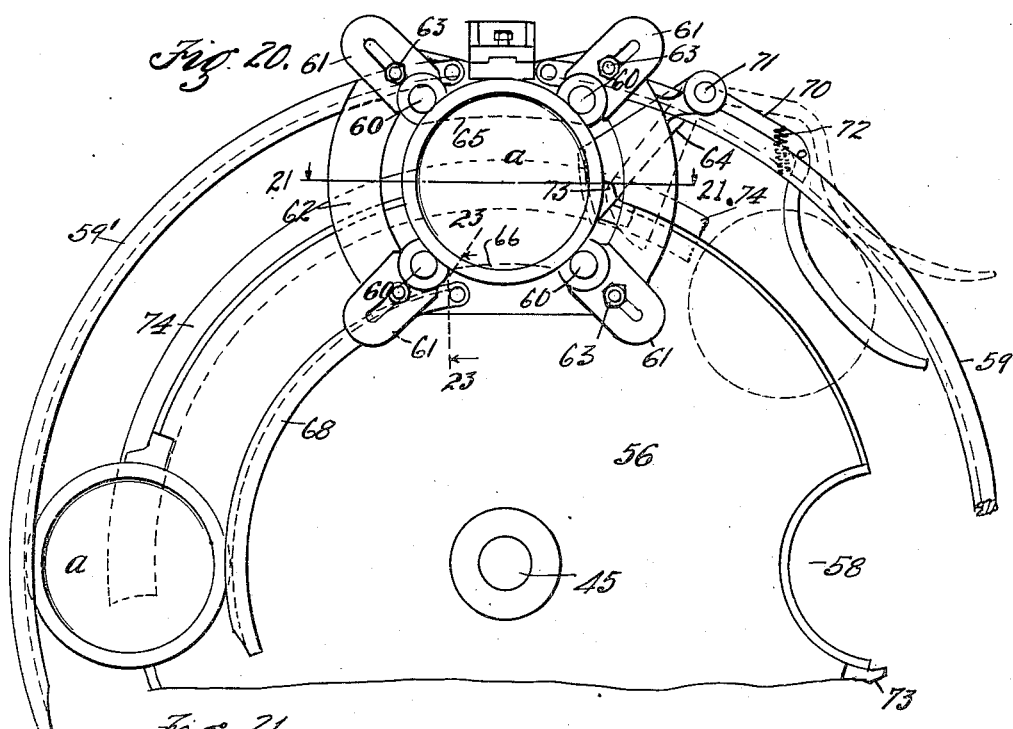
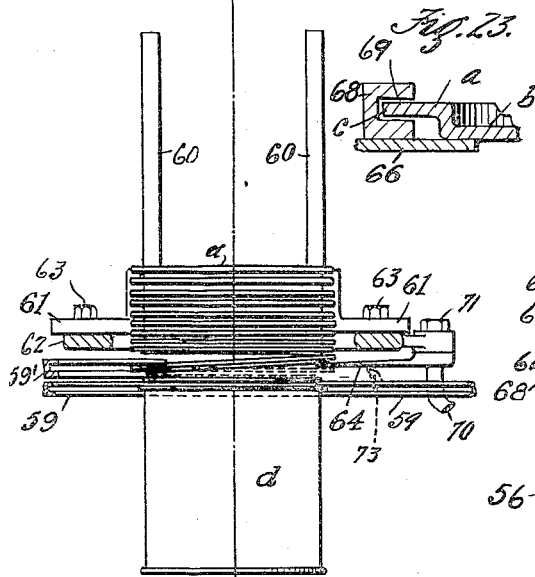
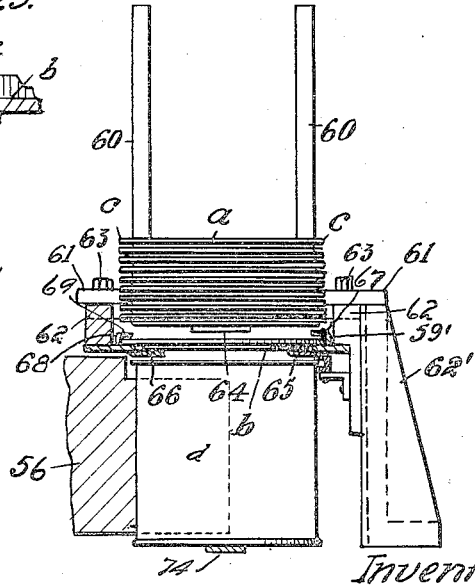

RAY O. WILSON AND ARTHUR D. SUMNER, OF LOS ANGELES, CALIFORNIA, ASSIGNORS OF THIRTY ONE-HUNDREDTHS TO SAID WILSON, THIRTY ONE-HUNDREDTHS TO SAID SUMNER, AND FORTY ONE-HUNDREDTHS TO F. F. STETSON, OF LOS ANGELES, CALIFORNIA.

CAN-HEADING MACHINE.

1,203,295.   Specification of Letters Patent.   Patented Oct. 31, 1916.

Application filed August 10, 1914.   Serial No. 856,117.

*To all whom it may concern:*

Be it known that we, RAY O. WILSON and ARTHUR D. SUMNER, both citizens of the United States, residing at Los Angeles, in the county of Los Angeles, State of California, have invented new and useful Improvements in Can-Heading Machines, of which the following is a specification.

This invention relates to a can heading machine, and particularly pertains to a mechanism for double seaming the ends or caps on metal cans.

It is the object of this invention to provide a can heading machine for placing the bottom ends on cans in the manufacture of the same and for double seaming the covers on the cans after the materials to be contained in the can have been placed therein, and the particular object is to provide a machine of this character which is continuous in operation, that is, in which the can is conveyed continuously through the machine in the heading operation without stop and start movements.

A further object is to provide a can heading machine which, by reason of a continuous and non-intermittent progress of cans therethrough, is capable of a more rapid and consequently larger output than is effected by most can heading machines now generally in use.

A further object is to provide a can heading machine in which a large number of cans will be operated on simultaneously and advanced continuously through the machine without interruption.

A further object is to provide a can heading machine which is compact so as to occupy small floor space and in which the parts are so arranged as to be readily accessible for removal, repairs or adjustment.

A further object is to provide means for feeding the ends of the cans to the can bodies and to provide means whereby the can body and the top therefor are delivered simultaneously to the primary seam forming mechanism.

A further object is to provide a seaming mechanism by which the joints between the can body and ends will be effectively sealed by spinning the contiguous edges of the can body and can-top together in a double seam, and which is effected while the can is advancing through the machine.

The invention is illustrated in the accompanying drawings, in which:

Figure 1 is a plan view of the can heading machine with end portions thereof broken away. Fig. 2 is a side elevation of same. Fig. 3 is a vertical section on the line 3—3 of Fig. 2, as seen in the direction indicated by the arrows. Fig. 4 is a vertical section on the line 4—4 of Fig. 2, as seen in the direction indicated by the arrows. Fig. 5 is a horizontal section on the line 5—5 of Fig. 2, illustrating the driving gears and indicating by arrows the direction of rotation of same. Fig. 6 is a horizontal section on the line 6—6 of Fig. 2, showing the can advancing mechanism. Fig. 7 is a detail in elevation of one of the stationary cam disks showing the formation of the cam groove on the periphery thereof, as seen on the line 7—7 of Fig. 6 in the direction indicated by the arrows. Fig. 8 is a diagrammatic view illustrating the movements of the can and the actions thereon during the double seaming operation. Fig. 9 is an enlarged detail section on the line 9—9 of Fig. 2, partly in elevation showing a can in position on the final double seamer. Fig. 10 is an enlarged detail vertical section on the line 10—10 of Fig. 2, illustrating the can in position on the initial seamer. Figs. 11, 12 and 13 are details in section of the initial seamer illustrating the manner in which the primary seam is formed between the can body and head. Figs. 14 and 15 are detail sections illustrating the manner of forming the initial seam on the can by the mechanism illustrated in Figs. 11, 12 and 13. Figs. 16, 17 and 18 are views illustrating the final seaming operation on the can and showing the method for effecting same. Fig. 19 is an enlarged detail showing the double seam between the can head and body as completed by the mechanism shown in Figs. 16, 17 and 18. Fig. 20 is an enlarged detail in plan of the can top seaming mechanism. Fig. 21 is a section and elevation on the line 21—21 of Fig. 20 illustrating the can tops as normally positioned in the can top feeding device. Fig. 22 is a vertical section on the line 22—22 of Fig. 21 showing a can top as delivered from the can top feeding mechanism. Fig. 23 is a detail section on the line 23—23 of Fig. 20, showing a can top positioned on the supporting plate at one side thereof.

More specifically, 25 indicates the stationary bed or base of the machine, which may be of any suitable construction, and which forms the main support of the various portions of the machine. Mounted in suitable bearings on the base 25 is a drive shaft 26 (reference being had to Fig. 5) which is fitted with a belt pulley 27 at one end thereof from which it may be rotated continuously from any suitable source of power; the opposite end of the drive shaft 26 being provided with a hand wheel 28 by means of which it may be rotated manually when it is desired to adjust the positions of the various parts controlled thereby when the machine is not in operation.

Mounted on the drive shaft 26 is a beveled pinion 29 meshing with a corresponding pinion on the underside of a spur gear 30, which in turn meshes with an idler gear 31 meshing with a large gear 32 mounted on a vertically extending tubular shaft 33; the gears 30 and 31 constituting speed reduction gears. A second beveled pinion 34 is mounted on the drive shaft 26 and meshes with a beveled gear 35 mounted on a shaft 36 which extends upwardly through the tubular shaft 33. Meshing with the gear 32 on one side thereof is a gear 37 on a vertical shaft 38 and meshing with the gear 32 on the side opposite the gear 37 is a gear 39 on a shaft 40, which gear 39 also meshes with a large gear wheel 41 on a shaft 42. A gear wheel 43 of a diameter slightly less than that of the gear wheel 41 meshes with the latter and also with a smaller gear 44; the gear 43 being mounted on a shaft 45 and the gear 44 on a shaft 46.

The tubular shaft 33, shaft 40 and shaft 42 extend upwardly through bearings 47, 48 and 49 carried by brackets 50, 51 and 52 respectively carried on an elevated portion 53 of the base 25, and the shafts 38, 45 and 46 are carried upward through suitably mounted bearings. The shaft 46 extends above a can receiving and feeding table 54 which is secured to the shaft 46 and revoluble therewith, and rigidly mounted on the upper end of the shaft 46 is a pair of curved can engaging arms 55 extending on opposite sides of the sides of the shaft 46 adjacent the surface of the revoluble table 54. The shaft 45 has a horizontally extending can feeding wheel 56 mounted thereon which wheel is arranged immediately above the table 54 and is formed with a plurality of can receiving pockets 58 on its vertical edge which pockets are approximately semi-cylindrical and are adapted to engage the sides of cans fed thereto by means of the arms 55; the wheel 56 and the arms 55 being rotated in opposite directions and at such speeds in relation to each other that a can advanced by an arm 55 will be moved into a pocket 58 on the wheel 56 and carried around to the initial seam forming mechanism later described. A curved guide rail 59 is arranged concentric with the wheel 56 and spaced therefrom and is adapted to engage the outer portions of the cans to maintain them in position in the pockets 58 as the wheel 56 revolves; this guide rail extending approximately half way around the wheel 56 on a plane below the upper face of the latter.

Means are provided for automatically feeding the can-tops to the cans as they are advanced by the wheel 56, which means is particularly illustrated in Figs. 20, 21 and 22, and includes a series of four upright guide members 60 arranged on the corners of a rectangle and between which the can-tops are arranged in a stack; the guide members 60 being carried on horizontally extending slotted plates 61 supported on brackets 62 and adapted to be rigidly secured to the latter by means of bolts 63 which pass through the slots in the plates 61; the plates 61 being adapted to be adjusted to position the guide members 60 to accommodate can-tops —a— of various diameters and to position them in proper relation to the cans advanced by the wheel 56. The brackets 62 are carried on a standard 62′ shown in Fig. 22. The guide members 60 are so arranged as to dispose the can-tops stacked therebetween immediately over the pockets 58 on the wheel 56 so that when a can-top is discharged from the stack, as will presently be described, it will be deposited immediately above a can being advanced by the wheel.

The can tops a are supported between the guide members 60 by means of a plate 64 which engages the edge of the lowermost can top, as shown in Fig. 21; the opposite edge of the lowermost can top extending downward toward a pair of spaced supporting plates 65 and 66, with the depressed portion b of the can top resting on the supporting plates 65 and 66 so that on withdrawal of the plate 64 from beneath the can top it will drop and be supported entirely on the plates 64 and 65, as shown in dotted lines in Fig. 21 and in full lines in Fig. 22.

The plates 65 and 66 are mounted on the undersides of the brackets 62 above the wheel 56 and the guide rail 59; the plate 65 connecting with the curved guide rail 59′ arranged above the guide rail 59 with its upper face flush with the underside of the lower wall of a groove 67 formed on the inner face of the guide rail 59′, and the plate 66 connects with a curved rail 68 having a groove 69 on its inner face and arranged concentric with the curved rail 59′ on a plane therewith. The grooves 67 and 69 are designed to receive peripheral flanges —c— formed on the can-tops —a— to support the can-tops clear of the cans —d— as the latter are advanced by the wheel 56. The plate 64 is mounted on a curved arm 70 pivoted at 71 on a lug on the bracket 62; the outer end portion of the arm 70 being curved inwardly beneath the rail 59 to extend in the path of travel of the can advanced by the wheel 56 in such manner that the can will operate to rock the arm 70 on its pivot 71 to withdraw the plate 64 out of engagement with the lower can-top —a— and cause the latter to drop and be supported solely on the plates 65 and 66. The arm 70 will be moved by the action of the can as indicated in dotted lines in Fig. 20 and will be restored to its normal position by means of a spring 72; the plate 64 on returning to its normal position engaging the flange —c— of the can top —a— arranged immediately above the can top previously dropped onto the plates 65 and 66. The forward edge of the plate 64 is formed with an inclined face which on engaging the edge of the can-top will act to slightly elevate that edge of the can-top so that can-top engaging members 73 carried by the wheel 56 will clear the can-top supported on the plate 64 and will engage the lowermost can-top supported on the plates 65 and 66.

The can-top engaging members 73 comprise outwardly and upwardly projecting fingers mounted on the upper edge of the wheel 56 to one side of the pockets 58; a can-top engaging member 73 being mounted at the upper outer edge of each pocket 58 as shown in Fig. 1, and operating when the wheel 56 is revolved, when a can is positioned in the pocket 58 to actuate the lever 70, to engage the can-top released by the plate 64, and advance the can-top along the grooves 67 and 69 formed in the rails 59' and 68 respectively. The can tops will thus be advanced with the wheel 56 directly above the cans in the pockets 58 and will be spaced therefrom by reason of the can-top being supported on the rails 59' and 68 above the outer edge of the wheel 56, and above the top of the cans; the cans —d— being supported on an upwardly inclined rail 74 extending beneath the outer edge of the wheel 56 on the path of travel of the cans carried by the latter, and terminating at its lower end adjacent the table 54. The can-tops are thus supported clear of the contents of the cans which, frequently project above the upper edges of the cans, the cans, however, being gradually moved upward toward the can-top as it is advanced along the upwardly inclined can supporting rail 74 until the can and the top therefor are discharged from engagement with the wheel 56, as will presently be described.

Rigidly mounted on the shaft 42 is a collar 75 on which a series of four radiating brackets 76 are formed and on the outer ends of which brackets sleeves 77 are mounted, which sleeves form guides for vertically reciprocal stems 78, the lower ends of which are fitted with rollers 79 extending into a cam groove 80 formed on an annular flange 81 formed on the base 25 and encircling the shaft 42 concentric therewith. Each of the stems 78 is formed with an internally threaded bore 82 to receive a threaded stud 83 adapted to be adjusted vertically in relation to the stem and on which stud a collar 84 is rotatably mounted. The collar 84 is formed with an annular flange 85 intermediate its ends and has a disk 86 forming a chuck on its upper end; the disk 86 being formed with an annularly depending flange 87 adapted to slidably engage the upper end of the collar 84. Depending bolts 88 on the disk 86 pass through apertures in the flange 85 and are formed with heads 89 which are adapted to engage the underside of the flange 85 to limit the upward movement of the disk 86. The disk or chuck 86 thus has reciprocable and rotary movement in relation to the stem 78. A coiled spring 90 is interposed between the disk 86 and the flange 85 to normally maintain the disk 86 in its uppermost position and to provide a resilient seat therefor. The upper faces of the disks 86 are arranged on a plane with the upper end of the inclined rail 74 which terminates adjacent the path of travel of the outer edges of the disks 86 as the latter are advanced on the rotation of the shaft 42.

Rigidly mounted on the upper end of the shaft 42 is a cross head 91 comprising a series of radiating arms carrying sleeves 92 in which vertical tubular spindles 93 are revolubly mounted. A series of four of these spindles 93 and their bearings 92 are provided and on the lower end of each spindle 93 is a pinion 94 which meshes with a fixed gear 95 rigidly mounted on the bearing 49. Mounted on the underside of each pinion 94 and secured to the spindle 93 is a disk 96 which is formed with an outwardly extending flange 97 on its outer edge to receive a ring 98 which is slidable on the flange 97 and is normally disposed concentric with the disk 96 and the spindle 93 by means of a spring pressed ball 99 adapted to seat in an annular channel 100 formed on the upper face of the ring 98; a socket 101 being formed in the pinion 94 to receive the ball 99 and a pair of washers 102 between which a spring 103 is interposed.

A set screw 104 is mounted in the pinion 94 and bears against the upper washer 102 and is adapted to be adjusted so as to vary the tension of the spring 103.

The ring 98 is formed with an annular groove 105 on an offset portion of its inner wall, the lower edge of which groove is formed by a flange 106 having an outwardly diverging lower face. This ring 98 constitutes an initial seaming device and is designed to be normally disposed immediately above the can receiving disk 86 so as to engage the top of the can supported on the disk 86, as particularly shown in Fig. 10; a seaming ring 98 being positioned over each of the disks 86. The disk 96 is adapted to engage the top —a— of the can as particularly shown in Figs. 12 and 13, and operates to rotate the can when the gear 94 is revolved by being carried around the stationary gear 45 on the rotation of the shaft 42.

The rings 98 are adapted to be actuated on the rotating of the cross head 91 to engage the flanges —c— on the can covers —a— and turn a lip —e— on the flange —c— beneath an annular flange —f— on the top of the can, as shown in Figs. 14 and 15. The actuation of the rings 98 is effected by means of a cam disk 107 rigidly mounted on the underside of the stationary gear 95; the cam disk 107 having an arcuate face eccentric to the center of the shaft 42 on which the outer faces of the seaming rings 98 are adapted to bear, when performing the seam forming operation and having a concentric arcuate face which engages the rings as the gears 94 are rotated to position the rings concentric with the gears 94. When thus disposed they are engaged by the centering balls 99 so that the rings will be positioned concentric with the cans when the latter are fed to the disks 86 from the can feeding wheel 56. The disks 86 and the cross head 91 form a carriage for advancing the cans, which on being carried around by the rotation of the shaft 42 receive the initial seaming operation just described and as shown in Figs. 14 and 15, and are then subjected to a second operation, being delivered from the can receiving disks 86 to a platform 108 by means of an arm 109 mounted on the shaft 40; the arm 109 having a semi-circular end portion 109' adapted to engage the cans on the disks 86 and remove them from the latter. In order to permit the removal of the cans from the disks 86 the latter are moved downwardly by the action of the cam groove 80 on the flange 81 which allows the stems 78 to gravitate downward and withdraw the upper end of the cans on the disks 86 clear of the seaming ring 98.

The can engaged by the arm 109 is advanced over the platform 108 and is delivered to a disk 110 reciprocably mounted on a collar 111 rotatably mounted on a stud 112 carried by a reciprocal stem 113 having a roller 114 on its lower end engaged in a cam groove 115 on a flange 116 carried by the base 25 and formed concentric with the shaft 33. A series of four of the disks 110 and their mountings are provided and the stems 113 are slidably engaged by sleeves 117 carried on brackets 118 secured to the tubular shaft 33.

Mounted on the upper end of the tubular shaft 33 is a cross head 119 having a series of sleeves 120 forming bearings for tubular spindles 121 on the lower ends of which disks 122 are rigidly mounted; a disk 122 being disposed above each of the can receiving disks 110 and adapted to engage the tops of the cans delivered to the disks 110. The tubular shafts 121 are provided with gears 123 which mesh with a large gear 124 mounted on the shaft 36 extending through the tubular shaft 33. The shafts 33 and 36 are designed to be rotated in opposite directions so that the speed of rotation of the spindles 121 will be increased without the use of an excessively large gear 124 or reduced pinions 123.

The cans carried around by the disks 110 and 122 are designed to be subjected to the action of ordinary double seam compressing rollers 125 formed with annular grooves 126 thereon adapted to engage the seams on the upper edges of the cans as shown in Fig. 19. The double seam compressing rollers 125 are mounted upon bell crank lever arms 127 pivoted at 128 to the cross head 119; the bell crank arms 127 being provided with wheels 129 adapted to traverse a cam disk 130 rigidly mounted on the bearing 47; the cam disk 130 having an eccentric cam face by which the bell crank arms 127 are rocked to gradually increase the pressure of the can seam compressing rollers 125 on the can seam and crowd the seam against the disk 122 as the can is rapidly revolved by the latter, and thereby complete the seaming operation.

The can after being subjected to the action of the seam compressing rollers 125 are ejected from the disks 110 by means of arms 131 mounted on the shaft 38 and adapted to engage the can bodies and shove them off the can supporting disks 110 onto a suitable conveyer, not shown; the disks 110 moving into a lower position when the cans are engaged by the arms 131 so as to move the heads of the cans clear of the disks 122. The downward movement of the disks 110 is effected by the rollers 114 on the stems 113 moving downward in the cam groove 115 on the flange 116.

As a means for insuring the release of the cans from the disk 122 and the disks 96, stems 132 and 133 are mounted in the tubular shafts 121 and 93 respectively; the lower ends of the stems 132 and 133 being formed with shoulders 134 and 135 which are engaged by springs 136 and 137 supported upon inturned flanges on the lower ends of the shafts 121 and 93.

The springs 136 and 137 operate to normally maintain the stems 132 and 133 in an uppermost position with the lower ends of the stems above the lower faces of the disks 122 and 96 and out of contact with the can-top engaged by the disk. These stems 132 and 133 are designed to be depressed in opposition to the springs 136 and 137 to force the cans out of engagement with the disks 122 and 96 the moment the can supporting disks 110 and 86 are lowered by the action of the cam groove 115 and 80 on the rollers 114 and 79. The depression of the stems 132 and 133 is accomplished by means of stationary arms 138 and 139 mounted on standards carried by the base portion 53 which arms project in the path of travel of the upper ends of the stems 132 and 133 at points immediately above the points where the can supporting disks 110 and 86 are lowered in such manner that the stems 132 and 133 will be engaged by the arms 138 and 139 and thereby be suddenly depressed so as to impact against the head of the can.

The upper ends of the stems 132 and 133 project a short distance above the upper ends of the tubular shaft 121 and 93 and are formed with heads 140 and 141 respectively which have crowned upper faces which are engaged by curved lower faces on the arms 138 and 139.

As a means for permitting a slight relative movement of the arms of the bell crank arms 127 carrying the seaming rollers 125 and the cam engaging wheels 129 to permit the seaming rollers 125 to pass over the joint in the sides of the can body the arms 142 carrying the wheels 129 are formed of a resilient metal such as steel having sufficient rigidity to insure a proper seaming action of the rollers 125 but which will yield when subjected to the pressure thereon caused by the seaming rollers 125 passing over the can seam. To permit adjustment of the rollers 125 and the wheels 129 in relation to each other to accommodate them to cans of different diameters the arms carrying the rollers 125 are constructed to be adjusted to various angles in relation to the arms 142. To effect this adjustment, said arms are mounted separately on the pivot pins 128 and are formed with overlapping flanges 143 adapted to be secured together with the arms in a desired angular position in relation to each other by means of pins 144 extending through an aperture in the uppermost flange and adapted to engage any one of a series of apertures 145 formed in the lowermost flange on an arc of a circle concentric with the pivot pin 128.

In the operation of the invention, the drive shaft 26 is rotated continuously from any suitable source of power, thus effecting a continuous rotation of the shafts 33, 36, 38, 40, 42, 45 and 46 through the medium of the gears 29, 30, 31, 32, 34, 35, 37, 39, 41, 43 and 44, which are rotated in the directions indicated by the arrows in Fig. 5. This effects a continuous rotation of the arms 55 on the shaft 46, can feeding wheel 56 and shaft 45, the brackets 76 and cross head 91 on the shaft 42 carrying the primary seam forming mechanism, the arms 109 on the shaft 40, the brackets 118 and cross head 119 on the tubular shaft 33 carrying the final seaming mechanism, the gear 124 on the shaft 36 for accelerating the gears 123, and the arms 131 on the shaft 38.

It will now be seen that a can fed to the arms 55 will be advanced continuously during its travel through the machine and by reason of no intermittent movement of the can or the rotating parts conveying same that the can may be passed through the machine and subjected to the heading action thereof at a high speed, thus producing a machine that is capable of a rapid output.

The operations on the can are as follows: On its being engaged by the arms 55 it is advanced into a pocket 58 on the wheel 56 and carried around by the latter into the passage inside of the guide rail 59. The body of the can on striking the arm 70 rocks the latter on its pivot 71 and moves the plate 64 from beneath a can-top —a— so that the forward edge of the latter will drop as before described into the path of travel of the finger 73 on the wheel 56 at the rear edge of the pocket 58 carrying the can. The finger 73 will then carry the can-top —a— into the grooves 67 and 69 on the rails 59' and 68 with the can-top positioned directly above the can.

The can is supported on the inclined rail 74 and is moved by the wheel 56 into position over a can supporting disk 86 which is moved beneath the can by the rotation of the shaft 42 at a speed corresponding to that of the can; the can and the disk 86 registering coincidently when alined between the shafts 42 and 45. The disk 86 is then elevated by the action of the cam groove 80 on the roller 79, thereby causing the disk 86 to engage the lower end of the can and raise it into engagement with the can-top thereabove; the movement of the disk 86 being sufficient to carry the can-top into engagement with the disk 96. Sufficient pressure is exerted on the can between the disk 86 and the disk 96 that the rotation of the latter will operate to spin the can as it is advanced with the disk 86 and carried out of the pocket 58 on the wheel 56. While the can is being thus spun the seam forming ring 98 will be actuated by the cam 107 and moved into engagement with the lip —e— and flange —c— on the can top so as to bend the lip —e— beneath the flange —f— on the upper edge of the can body as shown in Fig. 15. The can will then be discharged from the disk 86 as before described and conveyed by the rotating arms 109 onto a disk 110 where it is engaged by the rapidly rotating disk 122 and spun while being advanced by the rotation of the shaft 33. The seaming roller 125 will then be caused to press against the seam between the can-top and can body by the action of the cam 130 as previously described, during a partial revolution of the shaft 33; the can being spun rapidly a number of revolutions during this action. On completion of this operation the can will be ejected from the disk 110 by the arm 131, as before described, with the can-top effectively secured thereto.

What we claim is:

1. In a can heading machine, a continuously revoluble member, a series of spindles thereon, disks on said spindles, means for rotating the spindles by the rotation of the revoluble member, means for clamping a can-top and can against each of the disks to cause the cans to rotate as they are advanced by the revoluble member, means encircling and forming a seam between the can-top and can while it is being advanced a partial revolution of the revoluble member, means for automatically removing the can from the revoluble member, continuous can advancing means adapted to receive the cans from said removing means, and means for rolling the seam between the can-top and can while it is being advanced continuously.

2. In a can heading machine, a revoluble carriage, vertically reciprocal can supporting means on said carriage, means for coincidently delivering can-tops and cans to the can supporting means while the carriage is rotating, means encircling the can top for forming seams between the can tops and cans while they are advancing on a partial revolution of the carriage, a second revoluble carriage, means for supporting cans on said second carriage, means for transferring the cans from the supporting means on one carriage to the supporting means on the other carriage, and means controlled by the rotation of the second carriage for rolling the seam formed between the can-tops and cans on the first carriage.

3. In a can heading machine, a pair of revoluble shafts, means for rotating said shafts continuously, a series of sleeves carried by each of said shafts, stems reciprocally mounted in said sleeves, means for reciprocating said stems on the rotation of the shafts, can supporting means carried by said stems, cross heads carried by said shafts, spindles revolubly mounted in said cross heads in alinement with the reciprocal stems, can-top encircling and engaging disks on said spindles, means for delivering can-tops and cans continuously between the supporting means and the disks carried by one of said shafts, means on said disks for forming seams between the can-tops and cans as they are advanced by a partial revolution of said last named shaft, means for automatically transposing the cans from the supporting means carried by one shaft to the supporting means carried by the other shaft, and means controlled by the rotation of the second shaft for rolling the seams between the can-tops and cans.

4. In a can heading machine, a pair of parallel vertically extending shafts one of which is tubular, means for rotating said shafts continuously in corresponding directions, a third shaft extending through the tubular shaft adapted to be rotated in a reverse direction in relation to said tubular shaft, a gear mounted on the third shaft, a cross head on the tubular shaft, a series of spindles on said cross head, pinions on said spindles meshing with the gear on the third shaft, can top engaging means on said spindles, seam rolling means carried by said cross head coöperating with the can top engaging means to roll the seams between the can tops and can bodies as they are spun by the rotation of said spindles during a partial revolution of the tubular shaft, means for supporting the cans to position the tops in operative relation to the seam rolling means, means on the other shaft for forming a seam between the can top and can body during a partial revolution of the shaft and while it is in motion, and means for transferring the cans from the seam forming means to the seam rolling means.

5. In a can heading machine, a continuously revoluble can conveying carriage, means movable with said carriage adapted to encircle and form a double seam between a can top and can body, means for spinning the can when encircled by the seaming means, a second continuously revoluble can conveying carriage, means on said second carriage for rolling the seam formed on the first carriage, and means for automatically passing the can from the first carriage to the second carriage.

6. In a can heading machine, a continuously revoluble can conveying carriage, means movable with said carriage adapted to encircle and form a double seam between a can top and can body, means for spinning the can when encircled by the seaming means, a second continuously revoluble can conveying carriage, means on said second carriage for rolling the seam formed on the first carriage, means for spinning the can during the seam rolling operation, and means for automatically passing the can from the first carriage to the second carriage.

7. In a can heading machine, a pair of rotary carriages, means for delivering cans and can tops continuously to one of said carriages, means on said last named carriage for encircling the can tops and cans to form a double seam, means for spinning the can and can top coöperating with said last named means, whereby the double seam is formed while the can is being advanced, means for conveying the can from one carriage to the other, seam rolling means on the other carriage, and means for spinning the cans to effect the seam rolling operation while the cans are being advanced.

8. In a can heading machine, a vertical shaft, a plurality of revoluble can supporting disks carried by said shaft, a stationary gear encircling said shaft, a series of pinions meshing with said gear and carried by said shaft in vertical axial alinement with the can supporting disks, means on said pinions adapted to encircle a can top and can carried on the supporting disk therebeneath to form a double seam between the can top and can body, and a stationary cam for coöperating with said last named means on the rotation of the shaft and the pinions to form a double seam.

9. In a can heading machine, a vertical shaft, a plurality of revoluble can supporting disks carried by said shaft, a stationary gear encircling said shaft, a series of pinions meshing with said gear and carried by said shaft in vertical axial alinement with the can supporting disks, means on said pinions adapted to encircle a can top and can carried on the supporting disk therebeneath to form a double seam between the can top and can body, a stationary cam for coöperating with said last named means on the rotation of the shaft and the pinions to form a double seam, a second shaft, revoluble can supporting means thereon, means for delivering the cans from the can supporting disks to the last named can supporting means, means for rotating the cans on their supporting means, and spring pressed rollers engageable with the double seam adapted to roll the latter on rotation of the last named shaft.

10. In a can heading machine, a vertical rotary shaft, a plurality of revoluble can supporting disks carried thereby, a series of spindles arranged in vertical alinement with the centers of said disks, bearings on said shaft in which said spindles are revolubly mounted, disks on said spindles opposite the can supporting disks, means for reciprocating the can supporting disks to clamp cans and can tops against the disks on the spindles, pinions on said spindles, a stationary gear concentric with the shaft engaging said pinions whereby the cans are spun on rotation of the shaft while advancing, and means on said pinions arranged to encircle the can top to form a double seam between the can top and can body.

11. In a can heading machine, a vertical rotary shaft, a plurality of revoluble can supporting disks carried thereby, a series of spindles arranged in vertical alinement with the centers of said disks, bearings on said shaft in which said spindles are revolubly mounted, disks on said spindles opposite the can supporting disks, means for reciprocating the can supporting disks to clamp cans and can tops against the disks on the spindles, pinions on said spindles, a stationary gear concentric with the shaft engaging said pinions whereby the cans are spun on rotation of the shaft while advancing, means on said pinions arranged to encircle the can top to form a double seam between the can top and can body, comprising diametrically slidable seaming rings, and a stationary cam arranged to shift said rings as the cans are advanced.

12. In a can heading machine, a pair of revoluble shafts, a plurality of resiliently supported revoluble can supporting disks carried by each of said shafts, revoluble spindles carried by each of said shafts in vertical alinement with the axes of said disks, can top engaging disks on said spindles, means whereby the rotation of said shafts will rotate said spindles and thereby spin cans carried by the supporting disks, means controlled by the spindles carried by one of the shafts for forming a double seam between the can tops and can bodies, means coöperating with the disks on the spindles carried by the other shaft for rolling the seams, means for rotating the shafts continuously in unison, and means for transferring the cans from one set of disks to the other set of disks.

13. In a can heading machine, means for clamping a can body and can top together, means for advancing the can and can top while clamped, means for rotating the clamping means while advancing to spin the can and can top, and means encircling the can top for forming a double seam while the can and top are spinning and advancing.

14. In a can heading machine, means for clamping a can body and can top together, means for advancing the can and can top while clamped, means for rotating the clamping means while advancing to spin the can and can top, means encircling the can top for forming a double seam while the can is spinning and advancing, means for automatically removing the can and can top from the clamping means, and means for thereafter rolling the double seam while the can is being advanced.

15. In a can heading machine, means for clamping a can body and can top together, comprising a can top engaging disk and a resiliently mounted vertically reciprocal can supporting disk, means for advancing the clamping means, means for rotating the can top engaging disk to spin a can while advancing, and means encircling the can top for forming a double seam while the can is spinning and advancing.

16. In a can heading machine, means for clamping a can body and can top together, comprising a can top engaging disk and a resiliently mounted vertically reciprocal can supporting disk, means for advancing the clamping means, means for rotating the can top engaging disk to spin a can while advancing, means encircling the can top for forming a double seam while the can is spinning and advancing, means for automatically removing the can from between the disks, and means for thereafter rolling the double seam thereon while the can is advancing.

17. In a can heading machine, means for clamping a can body and can top together, comprising a can top engaging disk and a resiliently mounted vertically reciprocal can supporting disk, means for advancing the clamping means, means for rotating the can top engaging disk to spin a can while advancing, comprising a spindle on which the disk is mounted, a pinion on said spindle, and a stationary gear meshing with said pinion around which the latter is advanced, and means encircling the can top for forming a double seam while the can is spinning and advancing.

18. In a can heading machine, a vertical revoluble shaft, a guide bearing carried thereby, a vertical stem slidably carried in said bearing, means for reciprocating said stem as the shaft is rotated, a revoluble can supporting disk reciprocally mounted in relation to said stem, a can top engaging disk spaced from the can supporting disk, means for rotating the can top engaging disk as the shaft revolves to spin a can and can top interposed between the disks, and means carried by the can top engaging disk encircling the can top for forming a double seam between the can top and can body as the latter is spun while the shaft is rotated.

In witness that we claim the foregoing we have hereunto subscribed our names this 1st day of July, 1914.

RAY O. WILSON.
ARTHUR D. SUMNER.

Witnesses:
   T. E. MONTEVERDE,
   MARGUERITE BATES.